US010892872B2

(12) United States Patent
Pan et al.

(10) Patent No.: US 10,892,872 B2
(45) Date of Patent: Jan. 12, 2021

(54) METHOD, SYSTEM AND DEVICE FOR DETERMINING REFERENCE SUBFRAME

(71) Applicant: CHINA ACADEMY OF TELECOMMUNICATIONS TECHNOLOGY, Beijing (CN)

(72) Inventors: Xueming Pan, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/308,835

(22) PCT Filed: May 7, 2015

(86) PCT No.: PCT/CN2015/078460
§ 371 (c)(1),
(2) Date: Nov. 3, 2016

(87) PCT Pub. No.: WO2015/169237
PCT Pub. Date: Nov. 12, 2015

(65) Prior Publication Data
US 2017/0078071 A1 Mar. 16, 2017

(30) Foreign Application Priority Data
May 8, 2014 (CN) .......................... 2014 1 0193240

(51) Int. Cl.
*H04L 5/00* (2006.01)
*H04W 72/04* (2009.01)
(Continued)

(52) U.S. Cl.
CPC ............ *H04L 5/0053* (2013.01); *H04L 5/005* (2013.01); *H04L 5/1469* (2013.01); *H04W 24/10* (2013.01);
(Continued)

(58) Field of Classification Search
CPC ..... H04L 5/0053; H04L 5/005; H04L 5/1469; H04W 72/0446; H04W 24/10; H04W 72/04
See application file for complete search history.

(56) References Cited

U.S. PATENT DOCUMENTS

2011/0249584 A1* 10/2011 Barbieri ............... H04L 1/0026
370/252
2012/0287875 A1* 11/2012 Kim ....................... H04B 7/024
370/329
(Continued)

FOREIGN PATENT DOCUMENTS

| CN | 103166734 A | 6/2013 |
| CN | 103220066 A | 7/2013 |

(Continued)

OTHER PUBLICATIONS

R1-140297, Remaining Detail of CSI Measurement and Report for TDD eIMTA Feb. 9, 2014.
(Continued)

*Primary Examiner* — Ivan O Latorre
(74) *Attorney, Agent, or Firm* — Ladas & Parry, LLP

(57) ABSTRACT

The present disclosure provides a method, a system and a device for determining a reference subframe. According to the embodiments of the present disclosure, with respect to one downlink CSI measurement subframe set, the UE determines a serial number of a downlink A-CSI reference subframe in the downlink CSI measurement subframe set in accordance with a predetermined rule, and determines the downlink A-CSI reference subframe in accordance with the determined serial number of the downlink A-CSI reference subframe.

18 Claims, 7 Drawing Sheets

```
                            ┌─ 500
 determining, by a network side device, at least two downlink CSI
        measurement subframe sets configured for a UE ↓
                            ┌─ 501
 with respect to one of the at least two downlink CSI measurement subframe sets, determining, by
 the network side device, a serial number of a downlink A-CSI reference subframe in the downlink
    CSI measurement subframe set in accordance with a predetermined rule, and determining the
        downlink A-CSI reference subframe in accordance with the determined serial number of the
                        downlink A-CSI reference subframe
```

(51) Int. Cl.
H04L 5/14 (2006.01)
H04W 24/10 (2009.01)
(52) U.S. Cl.
CPC ....... *H04W 72/04* (2013.01); *H04W 72/0446* (2013.01)

(56) References Cited

U.S. PATENT DOCUMENTS

| | | | |
|---|---|---|---|
| 2012/0300641 A1* | 11/2012 | Chen | H04L 1/0026 370/241 |
| 2013/0294242 A1* | 11/2013 | Zhao | H04W 72/1252 370/235 |
| 2013/0301448 A1 | 11/2013 | Sayana et al. | |
| 2013/0301589 A1* | 11/2013 | Li | H04W 24/10 370/329 |
| 2014/0010127 A1* | 1/2014 | Cheng | H04L 5/14 370/280 |
| 2014/0044109 A1 | 2/2014 | Nogami et al. | |
| 2014/0105055 A1 | 4/2014 | Kang et al. | |
| 2014/0211709 A1* | 7/2014 | Guan | H04L 1/0026 370/329 |
| 2014/0293815 A1 | 10/2014 | Xia et al. | |
| 2014/0362793 A1 | 12/2014 | Chai et al. | |
| 2016/0197687 A1* | 7/2016 | Song | H04L 5/00 370/252 |
| 2017/0034727 A1* | 2/2017 | Li | H04L 5/0048 |

FOREIGN PATENT DOCUMENTS

| | | |
|---|---|---|
| JP | 20110083402 A | 11/2012 |
| WO | WO2013086954 A1 | 6/2013 |
| WO | WO2013107389 A1 | 7/2013 |

OTHER PUBLICATIONS

R1-140438, Remaining Details of CSI Measurement and Reporting in eIMTA Feb. 9, 2014.
Office Action of Taiwan patent application No. 104114678, dated Jan. 5, 2017.
Extended European search report for Application No. 15789432.0-1875/3142439.
English translation of Written Opinion of the International Searching Authority in international application No. PCT/CN2015/078460.
International Preliminary Report on Patentability dated Jul. 9, 2015 for PCT/CN2015/078460.
Office Action of SIPO China, patent application No. 20140193240.8, dated Jan. 24, 2018.
Notification of Reasons for Refusal for JPO / INPIT, patent application No. 2016-565347, dated Dec. 19, 2017.
R1-140438, Remaining details of CSI measurement and reporting in eIMTA, Feb. 10-14, 2014.
R1-140530, Views on CSI measurement for LTE TDD eIMTA, Feb. 10-14, 2014.
R1-141174, Remaining details on aperiodic CSI feedback for transmission mode 1~9, Mar. 31-Apr. 4, 2014.
R1-141317, Aperiodic CSI reporting in TM1-9 for eIMTA, Mar. 31-Apr. 4, 2014.

* cited by examiner

-PRIOR ART-

-PRIOR ART-

-PRIOR ART-

METHOD, SYSTEM AND DEVICE FOR DETERMINING REFERENCE SUBFRAME

CROSS-REFERENCE TO RELATED APPLICATION

The present application is the U.S. national phase of PCT Application No. PCT/CN2015/078460 filed on May 7, 2015, which claims priorities of the Chinese patent application No. 201410193240.8 filed on May 8, 2014, which are incorporated herein by reference in its entirety.

TECHNICAL FIELD

The present disclosure relates to the field of wireless communication technology, in particular to a method, a system and a device for determining a reference subframe.

BACKGROUND

FIG. 1A shows a frame structure of a Long Term Evolution (LTE) Time Division Duplexing (TDD) system. One radio frame has a length of 10 ms, and includes 10 subframes consisting of special subframes and conventional subframes. Each subframe has a length of 1 ms. The special subframes each includes a Downlink Pilot Timeslot (DwPTS), an Uplink Pilot Timeslot (UpPTS), and a Guard Period (GP) between the DwPTS and the UpPTS. The conventional subframes include an uplink subframe and a downlink subframe.

In the TDD system, an identical frequency resource is adopted for both uplink and downlink transmission, so as to transmit uplink/downlink signals on different subframes. Along with the development of the technology, more and more low-power base stations, such as Pico cell and Home NodeB, have been deployed to provide small and local coverage. In these cells, the number of users may be small, and a service requirement for the user may change remarkably, so an uplink-to-downlink service proportion may change dynamically.

Based on the above, some more dynamic TDD uplink/downlink configuration schemes have attracted more and more attentions. For one dynamic uplink/downlink subframe configuration scheme, four types of subframes, i.e., a subframe dedicated for downlink transmission, a subframe dedicated for uplink transmission, a special subframe, and a subframe flexibly configured for uplink or downlink transmission, are provided within a certain time period. As shown in FIG. 1B, the time period is a radio frame (this time period is merely an example, and it may also be any other time periods). Subframes #0 and #5 are dedicated downlink subframes, subframes #2 and #7 are dedicated uplink subframes, subframes #1 and #6 are special subframes (which may also be classified as the dedicated downlink subframes), and the other subframes (i.e., subframes #3, #4, #8 and #9) are subframes flexibly configured for uplink or downlink transmission. Subframes #3, #4, #8 and #9 may be dynamically configured by the base station in accordance with real-time service requirements and a channel state, so as to be adapted to the dynamic change of the service requirements. In this scheme, each radio frame includes two uplink subframes and two special subframes constantly, and in a situation where the most DL resources are provided, a proportion of the DL subframes to the UL subframes is 4:1, i.e., this scheme cannot support the subframe configuration mode where more DL subframes are provided.

In a conventional TDD network consisting of multiple cells, an identical uplink/downlink configuration is adopted by different cells, so the following two types of inter-cell interference may be imposed on the base station or a User Equipment (UE) on the uplink or downlink subframes, as shown in FIG. 1C or FIG. 1D.

Type 1 adjacent cell interference: in the case of downlink transmission in two adjacent cells, a downlink signal from a base station in an adjacent cell may interfere with a downlink signal received by a UE in a current cell.

Type 2 adjacent cell interference: in the case of uplink transmission in two adjacent cells, an uplink signal from a UE in an adjacent cell may interfere with an uplink signal received by a base station in a current cell from the UE.

In addition, in the network consisting of multiple cells, in the case that different UL:DL proportions are configured for the adjacent cells, cross timeslot interference as shown in FIG. 1E may occur. In FIG. 1E, in a timeslot where a downlink signal is transmitted by a macro cell, an uplink signal may be received by a Pico cell, and at this time, two types of interference between the two cells may occur.

In each subframe set of the dynamic TDD system, it is required to measure and transmit Channel State Information (CSI). For the aperiodic CSI (A-CSI) measurement and feedback, it is necessary for the UE to find out an appropriate CSI reference subframe in the two subframe sets, so as to measure the A-CSI. In the dynamic TDD system, the UE needs to determine an uplink scheduling sequence in accordance with a UL-DL configuration, so merely the dedicated downlink subframe may be used as an A-CSI reference subframe. At this time, it is impossible to measure and transmit the A-CSI with respect to the subframe set whose data transmission direction can be changed dynamically.

One possible scheme will be described as follows. In the case that there are a downlink subframe set1 and a downlink subframe set2 and it is necessary for the UE to transmit DL A-CSI in a subframe n with respect to the downlink subframe set1, an A-CSI reference subframe is n−k1, where k1≥4, and n−k1 represents a downlink subframe in the subframe set1 closest to the subframe n. In the case that it is necessary for the UE to transmit DL A-CSI in the subframe n with respect to the downlink subframe set2, an A-CSI reference subframe is n−k2, where k2≥4, and n−k2 represents a downlink subframe in the subframe set2 closest to the subframe n.

FIG. 1F is a sequence diagram of the A-CSI measurement and feedback in a scenario where UL-DL configurations #0 and #5 are used in the dynamic TDD system.

The dynamic UL-DL configuration actually used in the network may be any one of the seven configurations, so merely the subframe #2 is always taken as the uplink subframe, so as to transmit the A-CSI. For the uplink scheduling sequence determined in accordance with the uplink reference configuration, A-CSI triggering signaling may be transmitted (triggered) in the downlink subframe #5. At this time, for all the subframe sets configured by the network, set1 includes {0,1,5,6,7,8}, i.e., the subframes identified by "S1"; and set2 includes {3,4,9}, i.e., the subframes identified by "S2". The UE needs to transmit the A-CSI in the subframe #2 with respect to set1 or set2, i.e., it needs to find out at least one available A-CSI reference subframe closest to the subframe #2 in each subframe set. In this example, in the case of transmitting the A-CSI with respect to set1, the UE may use a valid downlink subframe, at upstream of and closest to the subframe #2 of the radio frame L and spaced apart from the subframe #2 by at least four subframes, as a reference subframe. Based on the dynamic UL-DL configuration actually used in a radio frame L−1, the reference subframe may be one of subframes #8, #7, #6 and #5. The subframes #5 and #6 are both used as downlink subframes in various UL-DL configurations, so the UE may measure the A-SCI reference subframe (#5, #6, #7 or #8) of the radio frame L−1 after, rather than before, decoding the A-CSI triggering signaling transmitted in the subframe #5 of the radio frame L−1. In the same example, the A-CSI reference subframe with respect to set2 may also be affected by the dynamic UL-DL configuration actually used in the network. A valid A-CSI reference subframe closest to the subframe #2 of the radio frame L (e.g., subframe #3 or #4 of the radio frame L−1, or subframe #3, #4 or #9 of a radio frame L−2) is located at upstream of a subframe for the A-CSI triggering signaling, so the UE needs to try to measure the A-CSI or at least store a relevant signal before receiving the A-CSI triggering signaling, so as to transmit the A-CSI with respect to set2 once the A-CSI triggering signaling has been received in the subframe #5 of the radio frame L−1. In addition, the UL-DL configuration actually used in each radio frame may change dynamically, and it is impossible for the UE to predict whether or not a new-valid A-CSI reference subframe may be provided in the UL-DL configuration used by a next radio frame. Hence, it is required to measure the A-CSI or store the corresponding signal in the subframes #3, #4 and #9 of each radio frame.

In any other scenarios where uplink/downlink reference configurations are combined, the UE also needs to measure the A-CSI or store the relevant signal in advance. In this case, the processing complexity may increase, and also the measurement or storage operations may be performed many times. As a result, the power consumption may increase regarding a UE.

In a word, for a downlink measurement mechanism in the current dynamic TDD system, the processing complexity and the power consumption may increase unnecessarily.

SUMMARY

The present disclosure provides in some embodiments a method, a system and a device for determining a reference subframe, so as to simplify the processing and reduce the power consumption of the UE as compared with a downlink measurement mechanism in the conventional dynamic TDD system.

According to the embodiments of the present disclosure, with respect to one downlink CSI measurement subframe set, the UE may determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe. In this way, the UE may determine the downlink CSI measurement subframe set where A-CSI needs to be returned, and find out the corresponding A-CSI measurement reference subframe. As a result, it is able to effectively simplify the processing and reduce the power consumption of the UE.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

According to the embodiments of the present disclosure, with respect to one downlink CSI measurement subframe set, a UE may determine a serial number of a downlink A-CSI reference subframe in a downlink CSI measurement subframe set in accordance with a predetermined rule, and determine the downlink A-CSI reference subframe in accordance with the determined serial number of the downlink A-CSI reference subframe. In this way, the UE may determine the downlink CSI measurement subframe set where A-CSI needs to be returned, and find out the corresponding A-CSI measurement reference subframe. As a result, it is able to effectively simplify the processing and reduce the power consumption of the UE.

The present disclosure will be described hereinafter in conjunction with the drawings and embodiments.

Figure 2:
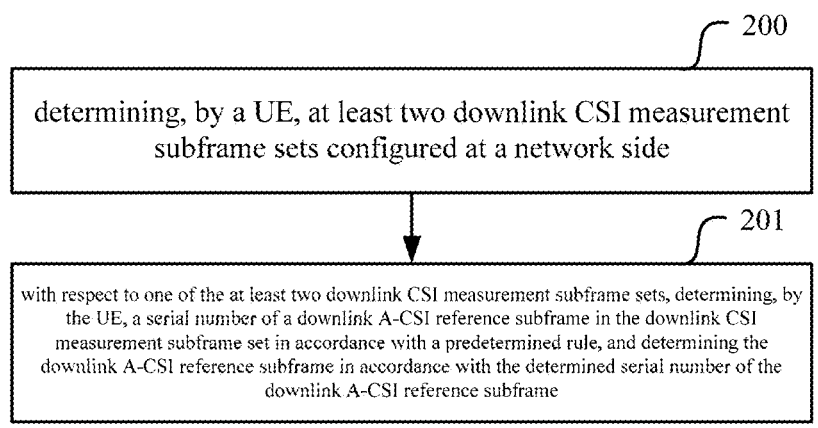
FIG. 2 is a flow chart of a method for determining a reference subframe according to the first embodiment of the present disclosure.

As shown in FIG. 2, the present disclosure provides in the first embodiment a method for determining a reference subframe, which includes: Step 200 of determining, by a UE, at least two downlink CSI measurement subframe sets configured at a network side: and Step 201 of, with respect to one of the at least two downlink CSI measurement subframe sets, determining, by the UE, a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

The predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by a network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

During the implementation, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer, and their values may be set in accordance with the practical need.

It should be appreciated that, the above-mentioned M1 lowest-ranked and M2 highest-ranked serial numbers of the subframes are for illustrative purposes, and the serial numbers of the subframes may also be set in accordance with the practical need. For example, an $X^{th}$ serial number in the serial numbers of the subframes in the downlink CSI measurement subframe set, in a descending order, may be selected.

Usually, during the implementation, it is not in all the downlink CSI measurement subframe sets that the downlink A-CSI reference subframe is determined in accordance with the determined serial number of the downlink A-CSI reference subframe. In one possible embodiment, whether or not the downlink CSI measurement subframe set meets a predetermined condition may be determined at first. In the case that the downlink CSI measurement subframe set meets the predetermined condition, the serial number of the downlink A-CSI reference subframe in the downlink CSI measurement subframe set may be determined in accordance with the predetermined rule.

During the implementation, in the case that there are two downlink CSI measurement subframe sets configured at the network side, in one possible embodiment, the UE may determine, with respect to one of the two downlink CSI measurement subframe sets, the downlink A-CSI reference subframe in the downlink CSI measurement subframe set in accordance with the predetermined rule. The downlink CSI measurement subframe set may be determined as mentioned above.

During the implementation, the predetermined condition includes one or two of the followings: there is no downlink A-CSI reference subframe within a range [subframe n–k1, subframe n–k2] which belongs to the downlink CSI measurement subframe set, a subframe n being an uplink subframe for transmitting A-CSI by the UE, the subframe n–k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

The range [subframe n–k1, subframe n–k2] includes the subframes n–k1 and n–k2, and a range in between.

In one possible embodiment, k2 is equal to 4.

During the implementation, in the case that the predetermined condition is met, the UE may determine the serial number of the downlink A-CSI reference subframe in the downlink CSI measurement subframe set in accordance with the predetermined rule.

In the case that the predetermined condition is not met, the following processing may be performed.

With respect to one of the at least two downlink CSI measurement subframe sets, in the case that the downlink CSI measurement subframe set does not meet the predetermined condition, the UE may determine a downlink subframe within the range [subframe n–k1, subframe n–k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n–k1 is a downlink subframe for transmitting A-CSI triggering signaling, where k1 and k2 are each a positive integer, and k1≥k2.

Subsequent to Step 201, the UE may further measure the A-CSI in accordance with the downlink A-CSI reference subframe.

To be specific, with respect to one of the at least two downlink CSI measurement subframe sets, in the case that there is a plurality of downlink A-CSI reference subframes in the downlink CSI measurement subframe set, the UE may measure the A-CSI for the downlink CSI measurement subframe set in a downlink A-CSI reference subframe of the downlink A-CSI reference subframes which is closest to the subframe n. In the case that there is only one downlink A-CSI reference subframe in the downlink CSI measurement subframe set, the UE may store a baseband signal value of the downlink A-CSI reference subframe.

In one possible embodiment, in the case that one of the at least two downlink CSI measurement subframe sets meets the predetermined condition and there is a plurality of downlink A-CSI reference subframes in the downlink CSI measurement subframe set, the UE may measure the A-CSI for the downlink CSI measurement subframe set in a downlink A-CSI reference subframe of the downlink A-CSI reference subframes which is closest to a subframe n, and in the case that the A-CSI triggering signaling corresponding to the downlink CSI measurement subframe set has been received in the subframe n–k1, the UE may return a measurement value in the subframe n. Alternatively, in the case that one of the at least two downlink CSI measurement subframe sets meets the predetermined condition and there is only one downlink A-CSI reference subframe in the downlink CSI measurement subframe set, the UE may measure the A-CSI for the downlink CSI measurement subframe set in the downlink A-CSI reference subframe, and in the case that the A-CSI triggering signaling corresponding to the downlink CSI measurement subframe set has been received in the subframe n–k1, the UE may return a measurement value in the subframe n.

In the case that one of the at least two downlink CSI measurement subframe sets meets the predetermined condition and there is a plurality of downlink A-CSI reference subframes in the downlink CSI measurement subframe set, the UE may store a baseband signal value of a downlink A-CSI reference subframe in the downlink A-CSI reference subframes, which is closest to the subframe n, and in the case that the A-CSI triggering signaling corresponding to the downlink CSI measurement subframe set has been received in the subframe n−k1, the UE may determine an A-CSI measurement value of the downlink CSI measurement subframe set in accordance with the stored baseband signal value, and return the A-CSI measurement value in the subframe n. Alternatively, in the case that one of the at least two downlink CSI measurement subframe sets meets the predetermined condition and there is only one downlink A-CSI reference subframe in the downlink CSI measurement subframe set, the UE may store a baseband signal value of the downlink A-CSI reference subframe, and in the case that the A-CSI triggering signaling corresponding to the downlink CSI measurement subframe set has been received in the subframe n−k1, the UE may determine an A-CSI measurement value of the downlink CSI measurement subframe set in accordance with the stored baseband signal value, and return the A-CSI measurement value in the subframe n.

In the case of determining a plurality of downlink A-CSI reference subframes, for various radio frames, the subframe with an identical serial number is an uplink subframe in one radio frame and a downlink subframe in another radio frame due to the dynamic configuration scenario. Based on this, in the case that a subframe corresponding to the serial number of the downlink A-CSI reference subframe and closest to the subframe n is an uplink subframe, the UE may determine a downlink subframe in the subframes corresponding to the serial number of the downlink A-CSI reference subframe and closest to the subframe n as the downlink A-CSI reference subframe. In the case that a subframe corresponding to the serial number of the downlink A-CSI reference subframe and closest to the subframe n is a downlink subframe, the UE may determine the downlink subframe as the downlink A-CSI reference subframe.

Some examples are provided as follows.

Example 1

Figure 1A:
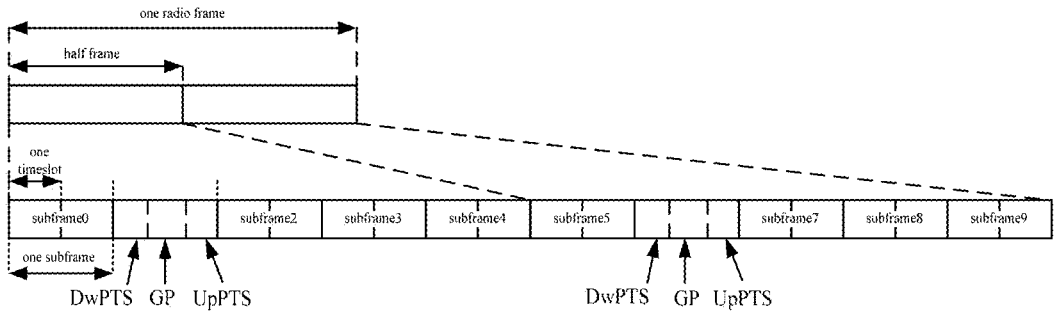
FIG. 1A is a schematic view showing a frame structure of a TD-LTE system.
Figure 1B:
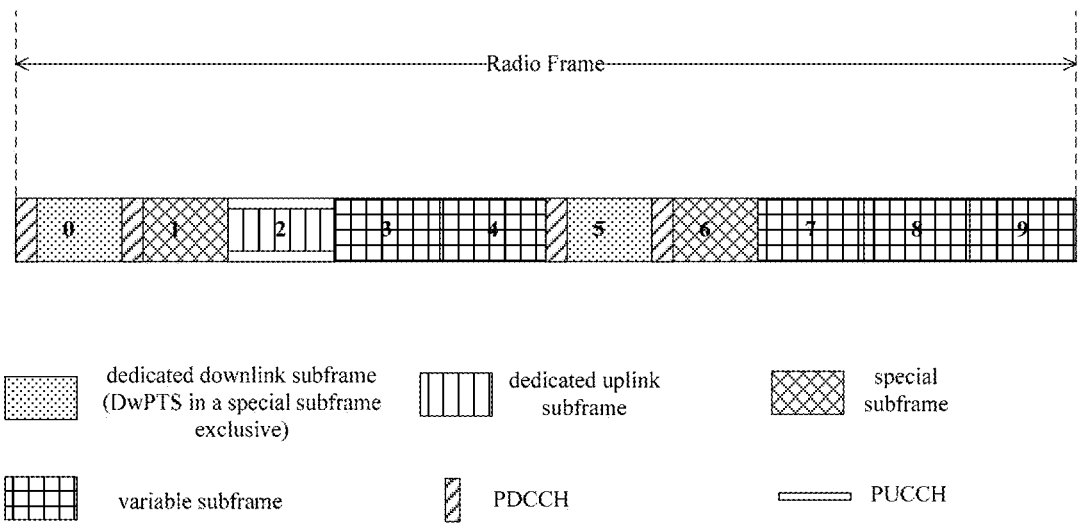
FIG. 1B is a schematic view showing a dynamic UL-DL subframe configuration.
Figure 1C:
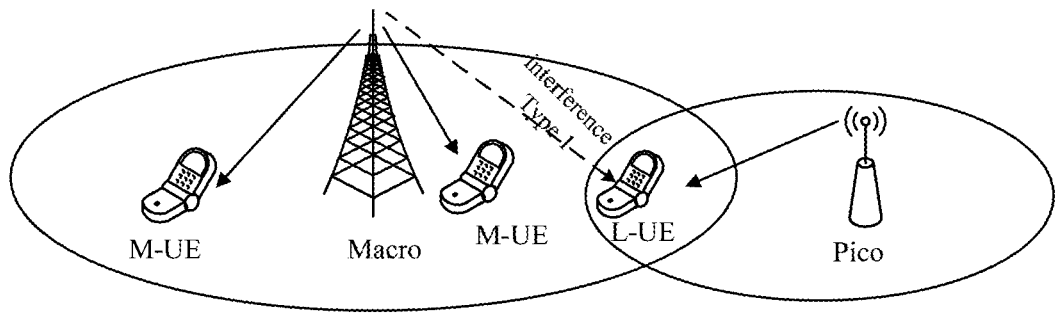
FIG. 1C is a schematic view showing a first type of inter-cell interference in the case of an identical TDD timeslot configuration.
Figure 1D:
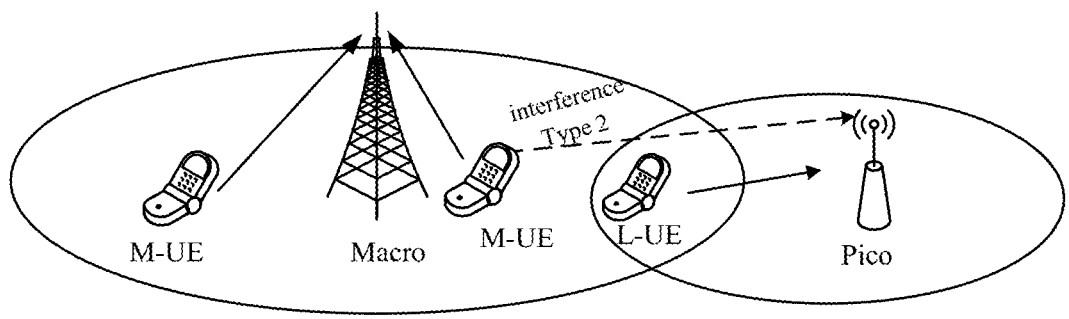
FIG. 1D is a schematic view showing a second type of inter-cell interference in the case of an identical TDD timeslot configuration.
Figure 1E:
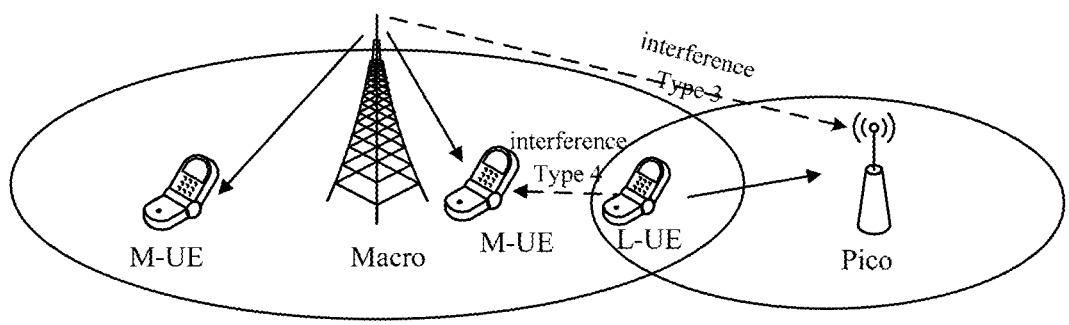
FIG. 1E is a schematic view showing TDD cross timeslot inter-cell interference.
Figure 1F:
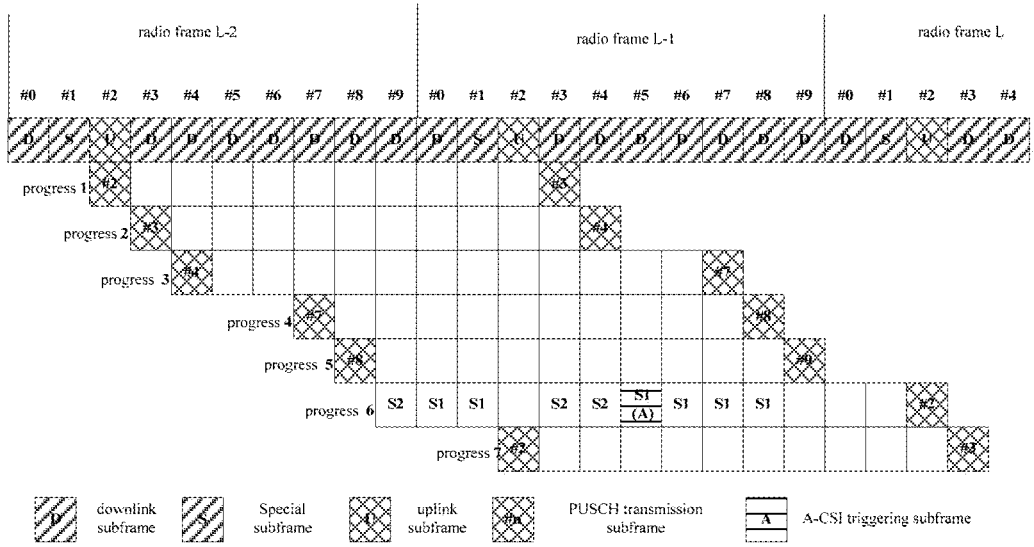
FIG. 1F is a feedback sequence diagram of A-CSI in a scenario where UL-DL configurations #0 and #5 are used in a dynamic TDD system.

Based on the example as shown in FIG. 1F, a subframe #4 in a subframe set 2 is configured at the network side as an A-CSI reference subframe. The UE needs to measure or store in advance a signal in the subframe #4 in a radio frame L−1, so as to trigger the A-CSI for the subframe set 2 through the A-CSI triggering signaling received in a subframe #5 in the radio frame L−1 and return the A-CSI in a subframe #2 of a radio frame L.

In the case that the subframe #4 in the radio frame L−1 is an uplink subframe, the UE may store a measurement result or signal acquired in a previous period in the case that the subframe #4 in a radio frame L−2 is a downlink subframe (in the case that the subframe #4 in the radio frame L−2 is still an uplink subframe, it needs to find the subframe #4 in the previous radio frames until the subframe #4 is a downlink subframe, and then the UE may store the measurement result or signal in the downlink subframe #4), so as to report the A-CSI for the subframe set 2 subsequently.

Figure 3A:
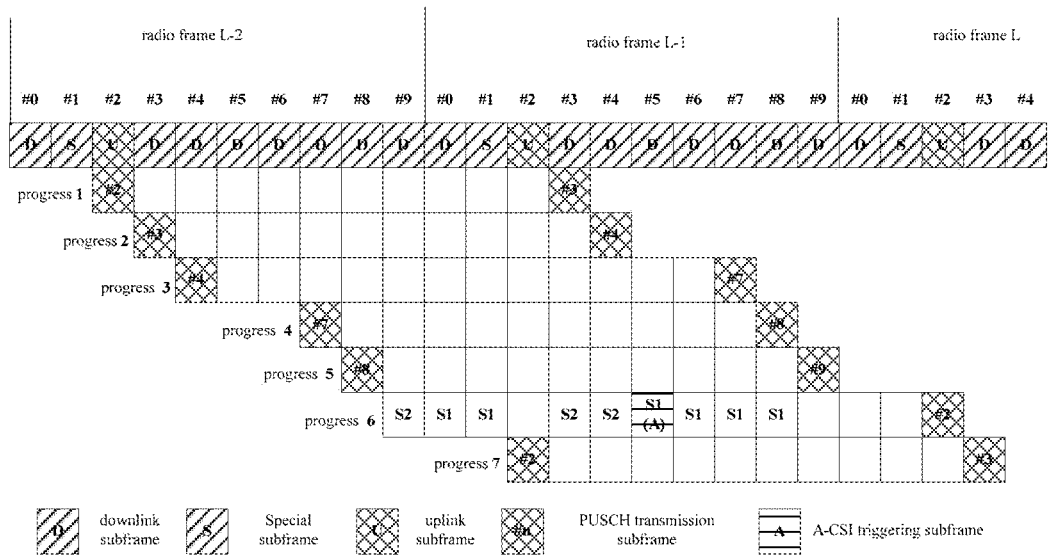
FIG. 3A is a sequence diagram according to one embodiment of the present disclosure.
Figure 3B:
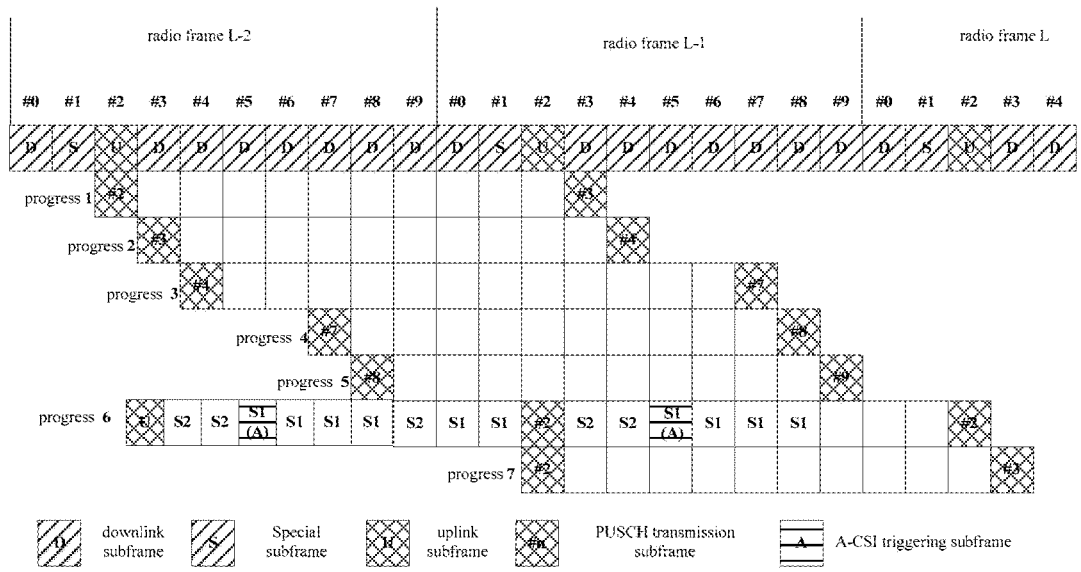
FIG. 3B is another sequence diagram according to one embodiment of the present disclosure.

In a subframe set 1, the UE may always find, behind a subframe for the A-CSI triggering signaling, a valid A-CSI reference subframe closest to the subframe #2 and spaced apart from the subframe #2 by at least four subframes. Hence, in the subframe set 1, the UE may determine the A-CSI reference subframe using an original scheme, as shown in FIG. 3A and FIG. 3B.

Example 2

Figure 4:
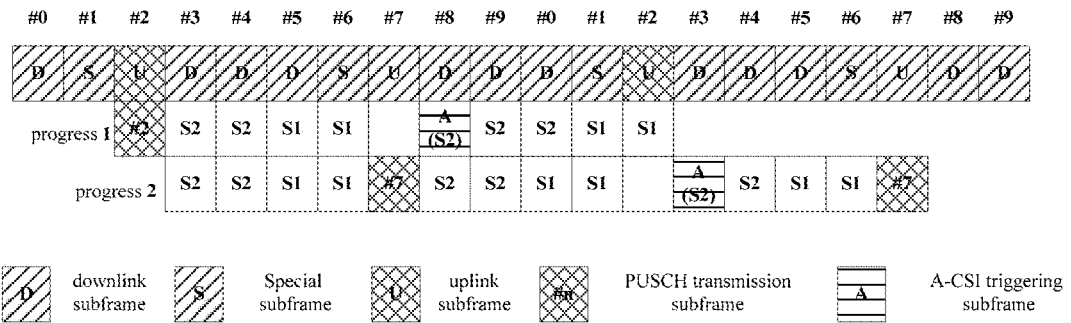
FIG. 4 is yet another sequence diagram according to one embodiment of the present disclosure.

As shown in FIG. 4, in the case that an UL-DL configuration #2 is used, the A-CSI triggering signaling may be transmitted in subframes {3,8}. For the subframe sets, set 1 may include {0,1,5,6}, and set 2 may include {3,4,7,8,9}.

The subframe #5 in set 1 may be configured at the network side as the A-CSI reference subframe. The UE merely needs to measure and store a signal in the subframe #5 in advance, so as to trigger the A-CSI for the subframe set 1 through the A-CSI triggering signaling received in a subframe #8 or #3, and return the A-CSI in a subframe #2 or #7.

In a subframe set 2, the A-CSI reference subframe #8 or #3 determined in an original scheme may always be a downlink subframe (in the uplink reference configuration, a downlink subframe cannot be changed into an uplink subframe dynamically). Hence, in the subframe set 2, the UE may determine the A-CSI reference subframe using the original scheme.

Figure 5:
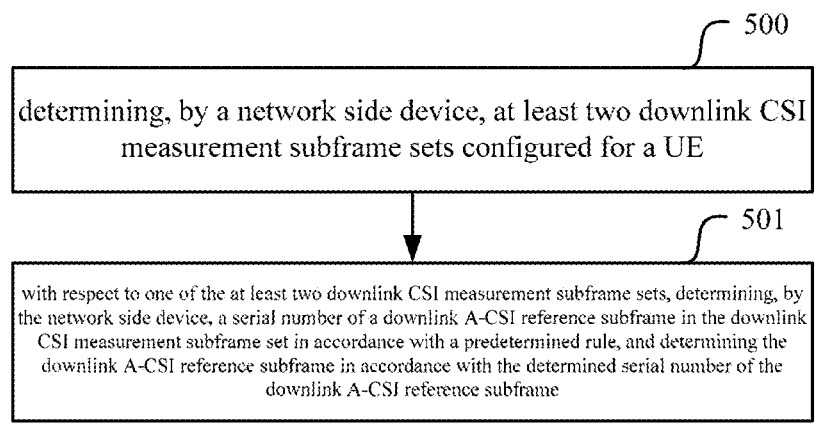
FIG. 5 is a flow chart of a method for determining a reference subframe according to the second embodiment of the present disclosure.

As shown in FIG. 5, the present disclosure provides in the second embodiment a method for determining a reference subframe, which includes: Step 500 of determining, by a network side device, at least two downlink CSI measurement subframe sets configured for a UE; and Step 501 of, with respect to one of the at least two downlink CSI measurement subframe sets, determining, by the network side device, a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

The predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by the network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

During the implementation, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer, and their values may be set in accordance with the practical need.

It should be appreciated that, the above-mentioned M1 lowest-ranked and M2 highest-ranked serial numbers of the subframes are for illustrative purposes, and the serial numbers of the subframes may also be set in accordance with the practical need. For example, an $X^{th}$ serial number in the serial numbers of the subframes in the downlink CSI measurement subframe set, in a descending order, may be selected.

Usually, during the implementation, it is not in all the downlink CSI measurement subframe sets that the downlink A-CSI reference subframe is determined in accordance with the determined serial number of the downlink A-CSI reference subframe. In one possible embodiment, whether or not the downlink CSI measurement subframe set meets a predetermined condition may be determined at first. In the case that the downlink CSI measurement subframe set meets the predetermined condition, the serial number of the downlink A-CSI reference subframe in the downlink CSI measurement subframe set may be determined in accordance with the predetermined rule.

During the implementation, in the case that there are two downlink CSI measurement subframe sets configured at the network side, in one possible embodiment, the network side device may determine, with respect to one of the two downlink CSI measurement subframe sets, the downlink A-CSI reference subframe in the downlink CSI measurement subframe set in accordance with the predetermined rule. The downlink CSI measurement subframe set may be determined as mentioned above.

During the implementation, the predetermined condition includes one or two of the followings: there is no downlink A-CSI reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

The range [subframe n−k1, subframe n−k2] includes the subframes n−k1 and n−k2, and a range in between.

In one possible embodiment, k2 is equal to 4.

During the implementation, in the case that the predetermined condition is met, the network side device may determine the serial number of the downlink A-CSI reference subframe in the downlink CSI measurement subframe set in accordance with the predetermined rule.

In the case that the predetermined condition is not met, the following processing may be performed.

With respect to one of the at least two downlink CSI measurement subframe sets, in the case that the downlink CSI measurement subframe set does not meet the predetermined condition, the network side device may determine a downlink subframe within the range [subframe n−k1, subframe n−k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n−k1 is a downlink subframe for transmitting A-CSI triggering signaling, where k1 and k2 are each a positive integer, and k1≥k2.

In one possible embodiment, in the case that a subframe corresponding to the serial number of the downlink A-CSI reference subframe and closest to the subframe n is an uplink subframe, the network side device may determine a downlink subframe in the subframes corresponding to the serial number of the downlink A-CSI reference subframe and closest to the subframe as the downlink A-CSI reference subframe, and in the case that a subframe corresponding to the serial number of the downlink A-CSI reference subframe and closest to the subframe n is a downlink subframe, the network side device may determine the downlink subframe as the downlink A-CSI reference subframe. Here, the subframe n is an uplink subframe for returning the A-CSI by the UE.

In one possible embodiment, subsequent to the step of determining, by the network side device, the downlink A-CSI reference subframe in accordance with the determined serial number of the downlink A-CSI reference subframe, the method further includes, with respect to one of the at least two downlink CSI measurement subframe sets, notifying, by the network side device, the UE of the downlink A-CSI reference subframe in the downlink CSI measurement subframe set.

During the implementation, the downlink A-CSI reference subframe may be notified in various ways, for example, through broadcasting, or Radio Resource Control (RRC) signaling.

In one possible embodiment, subsequent to the step of determining, by the network side device, the downlink A-CSI reference subframe in accordance with the determined serial number of the downlink A-CSI reference subframe, the method further includes transmitting, by the network side device, A-CSI triggering signaling with respect to at least one of the downlink CSI measurement subframe sets to the UE, so as to trigger the UE to report the A-CSI about the downlink A-CSI measurement subframe set. The A-CSI reported by the UE is measured in the determined A-CSI reference subframe.

Based on an identical inventive concept, the present disclosure further provides in some embodiments devices corresponding to the above-mentioned methods. A principle for solving the problem is identical to that mentioned above, so the implementations of the devices may refer to those of the methods, which will not be particularly elaborated again herein.

Figure 6:
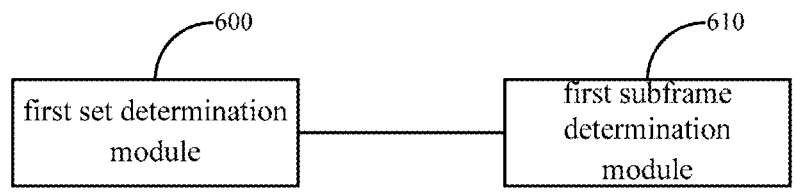
FIG. 6 is a schematic view showing a UE according to the third embodiment of the present disclosure.

As shown in FIG. 6, the present disclosure provides in the third embodiment a UE, which includes: a first set determination module 600 configured to determine at least two downlink CSI measurement subframe sets configured at a network side; and a first subframe determination module 610 configured to, with respect to one of the at least two downlink CSI measurement subframe sets, determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe.

The predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by a network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

In one possible embodiment, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer.

In one possible embodiment, the first subframe determination module 610 is further configured to, with respect to one of the at least two downlink CSI measurement subframe sets, determine that the downlink CSI measurement subframe set meets a predetermined condition, and then determine the serial number of the downlink A-CSI reference subframe in the downlink CSI measurement subframe set.

In one possible embodiment, the predetermined condition includes one or two of the followings: there is no downlink A-CSI reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

In one possible embodiment, the first subframe determination module 610 is further configured to, with respect to one of the at least two downlink CSI measurement subframe sets, in the case that the downlink CSI measurement subframe set does not meet the predetermined condition, determine a downlink subframe within a range [subframe n−k1, subframe n−k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n−k1 is a downlink subframe for transmitting A-CSI triggering signaling, where k1 and k2 are each a positive integer, and k1≥k2.

In one possible embodiment, k2 is equal to 4.

In one possible embodiment, the first subframe determination module 610 is further configured to: in the case that one of the at least two downlink CSI measurement subframe sets meets the predetermined condition and there is a plurality of downlink A-CSI reference subframes in the downlink CSI measurement subframe set, measure A-CSI for the downlink CSI measurement subframe set in a downlink A-CSI reference subframe of the downlink A-CSI reference subframes which is closest to a subframe n, and in the case that the A-CSI triggering signaling corresponding to the downlink CSI measurement subframe set has been received in the subframe n−k1, return a measurement value in the subframe n; or in the case that one of the at least two downlink CSI measurement subframe sets meets the predetermined condition and there is only one downlink A-CSI reference subframe in the downlink CSI measurement subframe set, measure the A-CSI for the downlink CSI measurement subframe set in the downlink A-CSI reference subframe, and in the case that the A-CSI triggering signaling corresponding to the downlink CSI measurement subframe set has been received in the subframe n−k1, return a measurement value in the subframe n.

In one possible embodiment, the first subframe determination module 610 is further configured to: in the case that one of the at least two downlink CSI measurement subframe sets meets the predetermined condition and there is a plurality of downlink A-CSI reference subframes in the downlink CSI measurement subframe set, store a baseband signal value of a downlink A-CSI reference subframe in the downlink A-CSI reference subframes, which is closest to the subframe n, and in the case that the A-CSI triggering signaling corresponding to the downlink CSI measurement subframe set has been received in the subframe n−k1, determine an A-CSI measurement value of the downlink CSI measurement subframe set in accordance with the stored baseband signal value, and return the A-CSI measurement value in the subframe n; or in the case that one of the at least two downlink CSI measurement subframe sets meets the predetermined condition and there is only one downlink A-CSI reference subframe in the downlink CSI measurement subframe set, store a baseband signal value of the downlink A-CSI reference subframe, and in the case that the A-CSI triggering signaling corresponding to the downlink CSI measurement subframe set has been received in the subframe n−k1, determine an A-CSI measurement value of the downlink CSI measurement subframe set in accordance with the stored baseband signal value, and return the A-CSI measurement value in the subframe n.

In one possible embodiment, the first subframe determination module 610 is further configured to: with respect to one of the at least two downlink CSI measurement subframe sets, in the case that there is a plurality of downlink A-CSI reference subframes in the downlink CSI measurement subframe set, measure A-CSI about the downlink CSI measurement subframe set in a downlink A-CSI reference subframe in the downlink A-CSI reference subframes which is closest to the subframe n; or with respect to one of the at least two downlink CSI measurement subframe sets, in the case that there is only one downlink A-CSI reference subframe in the downlink CSI measurement subframe set, store a baseband signal value of the downlink A-CSI reference subframe.

In one possible embodiment, the first subframe determination module 610 is further configured to: in the case that a subframe corresponding to the serial number of the downlink A-CSI reference subframe and closest to the subframe n is an uplink subframe, determine a downlink subframe in the subframes corresponding to the serial number of the downlink A-CSI reference subframe and closest to the subframe n as the downlink A-CSI reference subframe; or in the case that a subframe corresponding to the serial number of the downlink A-CSI reference subframe and closest to the subframe n is a downlink subframe, determine the downlink subframe as the downlink A-CSI reference subframe. The subframe n is an uplink subframe for returning the A-CSI by the UE.

In one possible embodiment, the first subframe determination module 610 is further configured to, in the case that there are two downlink CSI measurement subframe sets configured at the network side, determine, with respect to one of the two downlink CSI measurement subframe sets, the downlink A-CSI reference subframe in the downlink CSI measurement subframe set in accordance with the predetermined rule.

Figure 7:
FIG. 7 is a schematic view showing a network side device according to the fourth embodiment of the present disclosure.

As shown in FIG. 7, the present disclosure provides in the fourth embodiment a network side device, which includes: a second set determination module 700 configured to determine at least two downlink CSI measurement subframe sets configured for a UE; and a second subframe determination module 710 configured to, with respect to one of the at least two downlink CSI measurement subframe sets, determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe.

In one possible embodiment, the predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by the network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

In one possible embodiment, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer.

In one possible embodiment, the second subframe determination module 710 is further configured to determine, with respect to one of the at least two downlink CSI measurement subframe sets, that the downlink CSI measurement subframe set meets a predetermined condition, and then determine the serial number of the downlink A-CSI reference subframe in the downlink CSI measurement subframe set.

In one possible embodiment, the predetermined condition includes one or two of the followings: there is no downlink A-CSI reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

In one possible embodiment, the second subframe determination module 710 is further configured to, with respect to one of the at least two downlink CSI measurement subframe sets, in the case that the downlink CSI measurement subframe set does not meet the predetermined condition, determine a downlink subframe within a range [subframe n−k1, subframe n−k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n−k1 is a downlink subframe for transmitting A-CSI triggering signaling, where k1 and k2 are each a positive integer, and k1≥k2.

In one possible embodiment, k2 is equal to 4.

In one possible embodiment, the second subframe determination module 710 is further configured to: in the case that a subframe corresponding to the serial number of the downlink A-CSI reference subframe and closest to the subframe n is an uplink subframe, determine a downlink subframe in the subframes corresponding to the serial number of the downlink A-CSI reference subframe and closest to the subframe n as the downlink A-CSI reference subframe; or in the case that a subframe corresponding to the serial number of the downlink A-CSI reference subframe and closest to the subframe n is a downlink subframe, determine the downlink subframe as the downlink A-CSI reference subframe. The subframe n is an uplink subframe for returning the A-CSI by the UE.

In one possible embodiment, the second subframe determination module 710 is further configured to, in the case that there are two downlink CSI measurement subframe sets configured at the network side, determine, with respect to one of the two downlink CSI measurement subframe sets, the downlink A-CSI reference subframe in the downlink CSI measurement subframe set in accordance with the predetermined rule.

In one possible embodiment, the second subframe determination module 710 is further configured to, with respect to one of the at least two downlink CSI measurement subframe sets, notify the UE of the downlink A-CSI reference subframe in the downlink CSI measurement subframe set.

In one possible embodiment, the second subframe determination module 710 is further configured to transmit A-CSI triggering signaling with respect to at least one of the downlink CSI measurement subframe sets to the UE, so as to trigger the UE to report the A-CSI about the downlink A-CSI measurement subframe set. The A-CSI reported by the UE is measured in the determined A-CSI reference subframe.

Figure 8:
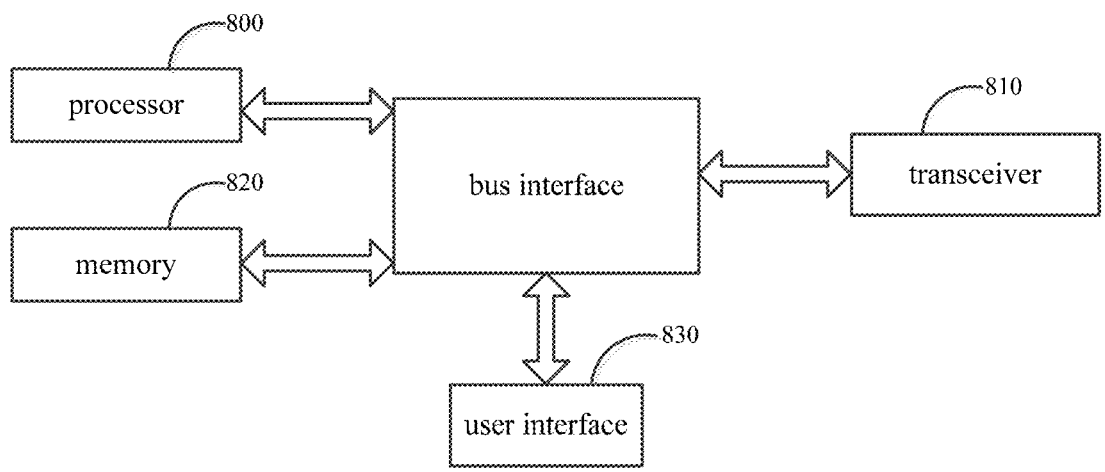
FIG. 8 is another schematic view showing the UE according to the fifth embodiment of the present disclosure.

As shown in FIG. 8, the present disclosure provides in the fifth embodiment a UE, which includes a processor 800 and a transceiver 810. The processor 800 is configured to determine at least two downlink CSI measurement subframe sets configured at a network side; and with respect to one of the at least two downlink CSI measurement subframe sets, determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe. The transceiver 810 is configured to receive and transmit data under the control of the processor 800.

In one possible embodiment, the predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by a network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

In one possible embodiment, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer.

In one possible embodiment, the processor 800 is further configured to, with respect to one of the at least two downlink CSI measurement subframe sets, determine that the downlink CSI measurement subframe set meets a predetermined condition, and then determine the serial number of the downlink A-CSI reference subframe in the downlink CSI measurement subframe set.

In one possible embodiment, the predetermined condition includes one or two of the followings: there is no downlink A-CSI reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

In one possible embodiment, the processor 800 is further configured to, with respect to one of the at least two downlink CSI measurement subframe sets, in the case that the downlink CSI measurement subframe set does not meet the predetermined condition, determine a downlink subframe within a range [subframe n−k1, subframe n−k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n−k1 is a downlink subframe for transmitting A-CSI triggering signaling, where k1 and k2 are each a positive integer, and k1≥k2.

In one possible embodiment, k2 is equal to 4.

In one possible embodiment, the processor 800 is further configured to: in the case that one of the at least two downlink CSI measurement subframe sets meets the predetermined condition and there is a plurality of downlink A-CSI reference subframes in the downlink CSI measurement subframe set, measure A-CSI for the downlink CSI measurement subframe set in a downlink A-CSI reference subframe of the downlink A-CSI reference subframes which is closest to a subframe n, and in the case that the A-CSI triggering signaling corresponding to the downlink CSI measurement subframe set has been received in the subframe n−k1, return a measurement value in the subframe n; or in the case that one of the at least two downlink CSI measurement subframe sets meets the predetermined condition and there is only one downlink A-CSI reference subframe in the downlink CSI measurement subframe set, measure the A-CSI for the downlink CSI measurement subframe set in the downlink A-CSI reference subframe, and in the case that the A-CSI triggering signaling corresponding to the downlink CSI measurement subframe set has been received in the subframe n−k1, return a measurement value in the subframe n.

In one possible embodiment, the processor 800 is further configured to: in the case that one of the at least two downlink CSI measurement subframe sets meets the predetermined condition and there is a plurality of downlink A-CSI reference subframes in the downlink CSI measurement subframe set, store a baseband signal value of a downlink A-CSI reference subframe in the downlink A-CSI reference subframes, which is closest to the subframe n, and in the case that the A-CSI triggering signaling corresponding to the downlink CSI measurement subframe set has been received in the subframe n−k1, determine an A-CSI measurement value of the downlink CSI measurement subframe set in accordance with the stored baseband signal value, and return the A-CSI measurement value in the subframe n; or in the case that one of the at least two downlink CSI measurement subframe sets meets the predetermined condition and there is only one downlink A-CSI reference subframe in the downlink CSI measurement subframe set, store a baseband signal value of the downlink A-CSI reference subframe, and in the case that the A-CSI triggering signaling corresponding to the downlink CSI measurement subframe set has been received in the subframe n−k1, determine an A-CSI measurement value of the downlink CSI measurement subframe set in accordance with the stored baseband signal value, and return the A-CSI measurement value in the subframe n.

In one possible embodiment, the processor 800 is further configured to: with respect to one of the at least two downlink CSI measurement subframe sets, in the case that there is a plurality of downlink A-CSI reference subframes in the downlink CSI measurement subframe set, measure A-CSI about the downlink CSI measurement subframe set in a downlink A-CSI reference subframe in the downlink A-CSI reference subframes which is closest to the subframe n; or with respect to one of the at least two downlink CSI measurement subframe sets, in the case that there is only one downlink A-CSI reference subframe in the downlink CSI measurement subframe set, store a baseband signal value of the downlink A-CSI reference subframe.

In one possible embodiment, the processor 800 is further configured to: in the case that a subframe corresponding to the serial number of the downlink A-CSI reference subframe and closest to the subframe n is an uplink subframe, determine a downlink subframe in the subframes corresponding to the serial number of the downlink A-CSI reference subframe and closest to the subframe as the downlink A-CSI reference subframe; or in the case that a subframe corresponding to the serial number of the downlink A-CSI reference subframe and closest to the subframe n is a downlink subframe, determine the downlink subframe as the downlink A-CSI reference subframe. The subframe n is an uplink subframe for returning the A-CSI by the UE.

In one possible embodiment, the processor 800 is further configured to, in the case that there are two downlink CSI measurement subframe sets configured at the network side, determine, with respect to one of the two downlink CSI measurement subframe sets, the downlink A-CSI reference subframe in the downlink CSI measurement subframe set in accordance with the predetermined rule.

In FIG. 8, a bus architecture may include a number of buses and bridges connected to each other, so as to connect various circuits for one or more processors 800 and one or more memories 820. In addition, as is known in the art, the bus architecture may be used to connect any other circuits, such as a circuit for a peripheral device, a circuit for a voltage stabilizer and a power management circuit. Bus interfaces are provided, and the transceiver 810 may consist of a plurality of elements, i.e., a transmitter and a receiver for communication with any other devices over a transmission medium. With respect to different UEs, a user interface 830 may also be provided for devices which are to be arranged inside or outside the UE, and these devices may include but not limited to a keypad, a display, a speaker, a microphone and a joystick.

The processor 800 may take charge of managing the bus architecture as well general processings. The memory 820 may store data desired for the operation of the processor 800.

Figure 9:
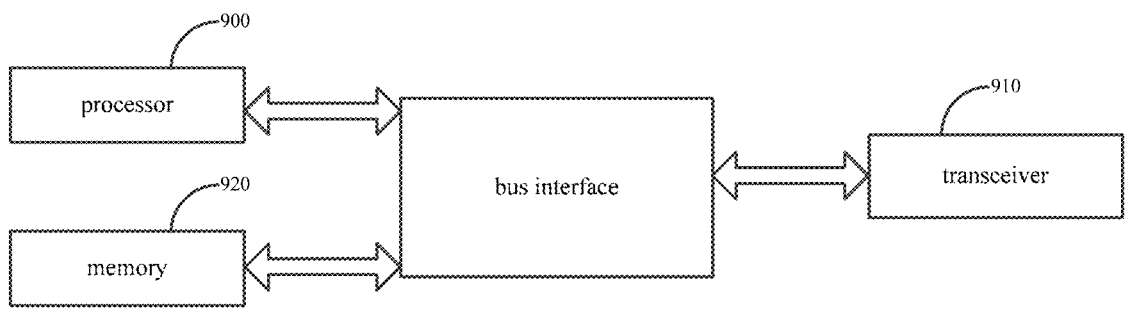
FIG. 9 is another schematic view showing the network side device according to the sixth embodiment of the present disclosure.

As shown in FIG. 9, the present disclosure provides in the sixth embodiment a network side device, which includes a processor 900 and a transceiver 910. The processor 900 is configured to: determine at least two downlink CSI measurement subframe sets configured for a UE; and with respect to one of the at least two downlink CSI measurement subframe sets, determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe. The transceiver 910 is configured to receive and transmit data under the control of the processor 900.

In one possible embodiment, the predetermined rule includes one or two of: determining a serial number of a subframe corresponding to a subset of the downlink CSI measurement subframe set as the serial number of the downlink A-CSI reference subframe in the CSI measurement subframe set in accordance with the downlink A-CSI reference subframe configured by the network side device for the UE; and determining a serial number of a subframe corresponding to a subset of the downlink CSI measurement subframe set as the serial number of the downlink A-CSI reference subframe in the CSI measurement subframe set in accordance with a rule set in a protocol.

In one possible embodiment, the subset includes at least one subframe.

In one possible embodiment, the rule set in the protocol includes determining the serial number of the downlink A-CSI reference subframe in the downlink CSI measurement subframe set in accordance with serial numbers of the subframes in the downlink CSI measurement subframe set.

In one possible embodiment, the serial numbers of the subframes in the downlink CSI measurement subframe set include a part of or all of: M1 lowest-ranked serial numbers of the subframes in the downlink CSI measurement subframe set; and M2 highest-ranked serial numbers of the subframes in the downlink CSI measurement subframe set. Here, M1 and M2 are each a positive integer.

In one possible embodiment, the processor 900 is further configured to, with respect to one of the at least two downlink CSI measurement subframe sets, that the downlink CSI measurement subframe set meets a predetermined condition, and then determine the serial number of the downlink A-CSI reference subframe in the downlink CSI measurement subframe set.

In one possible embodiment, the predetermined condition includes one or two of the followings: there is no downlink A-CSI reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and k1≥k2; and the serial number of the downlink A-CSI reference subframe in the downlink CSI measurement subframe set is configured at the network side.

In one possible embodiment, the processor 900 is further configured to, with respect to one of the at least two downlink CSI measurement subframe sets, in the case that the downlink CSI measurement subframe set does not meet the predetermined condition, determine a downlink subframe within a range [subframe n−k1, subframe n−k2], which belongs to the downlink CSI measurement subframe set and which is closest to a subframe n, as the downlink A-CSI reference subframe in the downlink CSI measurement subframe set. The subframe n is an uplink subframe for transmitting A-CSI by the UE, the subframe n−k1 is a downlink subframe for transmitting A-CSI triggering signaling, where k1 and k2 are each a positive integer, and k1≥k2.

In one possible embodiment, k2 is equal to 4.

In one possible embodiment, the processor 900 is further configured to: in the case that a subframe corresponding to the serial number of the downlink A-CSI reference subframe and closest to the subframe n is an uplink subframe, determine a downlink subframe in the subframes corresponding to the serial number of the downlink A-CSI reference subframe and closest to the subframe n as the downlink A-CSI reference subframe; or in the case that a subframe corresponding to the serial number of the downlink A-CSI reference subframe and closest to the subframe n is a downlink subframe, determine the downlink subframe as the downlink A-CSI reference subframe. The subframe n is an uplink subframe for returning the A-CSI by the UE.

In one possible embodiment, the processor 900 is further configured to, in the case that there are two downlink CSI measurement subframe sets configured at the network side, determine, with respect to one of the two downlink CSI measurement subframe sets, the downlink A-CSI reference subframe in the downlink CSI measurement subframe set in accordance with the predetermined rule.

In one possible embodiment, the processor 900 is further configured to, with respect to one of the at least two downlink CSI measurement subframe sets, notify the UE of the downlink A-CSI reference subframe in the downlink CSI measurement subframe set.

In one possible embodiment, the processor 900 is further configured to transmit A-CSI triggering signaling with respect to at least one of the downlink CSI measurement subframe sets to the UE, so as to trigger the UE to report the A-CSI about the downlink A-CSI measurement subframe set. The A-CSI reported by the UE is measured in the determined A-CSI reference subframe.

In FIG. 9, a bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of a plurality of elements, i.e., a transmitter and a receiver for communication with any other devices over a transmission medium. The processor 900 may take charge of managing the bus architecture as well general processings. The memory 920 may store data desired for the operation of the processor 900.

Figure 10:
FIG. 10 is a schematic view showing a system for determining a reference subframe according to the seventh embodiment of the present disclosure.

As shown in FIG. 10, the present disclosure provides in the seventh embodiment a system for determining a reference subframe, which includes a UE 10 and a network side device 11. The UE 10 is configured to: configured to determine at least two downlink CSI measurement subframe sets configured at a network side, determine, with respect to one of the at least two downlink CSI measurement subframe sets, a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe. The network side device 11 is configured to determine at least two downlink CSI measurement subframe sets configured for the UE, determine, with respect to one of the at least two downlink CSI measurement subframe sets, the serial number of the downlink A-CSI reference subframe in the downlink CSI measurement subframe set in accordance with the predetermined rule, and determine the downlink A-CSI reference subframe in accordance with the determined serial number of the downlink A-CSI reference subframe.

According to the embodiments of the present disclosure, with respect to one downlink CSI measurement subframe set, the UE may determine a serial number of a downlink A-CSI reference subframe in the downlink CSI measurement subframe set in accordance with a predetermined rule, and determine the downlink A-CSI reference subframe in accordance with the determined serial number of the downlink A-CSI reference subframe. In this way, the UE may determine the downlink CSI measurement subframe set where A-CSI needs to be returned, and find out the corresponding A-CSI measurement reference subframe. As a result, it is able to effectively simplify the processing and reduce the power consumption of the UE.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

What is claimed is:

1. A method for determining a reference subframe, comprising the steps of:
   determining, by a User Equipment (UE), at least two downlink Channel State Information (CSI) measurement subframe sets configured at a network side;
   determining, by the UE, that the downlink CSI measurement subframe set meets a predetermined condition, wherein the predetermined condition is set as: there is no downlink Aperiodic CSI (A-CSI) reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and where k1≥k2; and
   with respect to one of the at least two downlink CSI measurement subframe sets, determining, by the UE, a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

2. The method according to claim 1, wherein the predetermined rule comprises one or two of:
   determining a serial number of a subframe corresponding to a subset of the downlink CSI measurement subframe set as the serial number of the downlink A-CSI reference subframe in the CSI measurement subframe set in accordance with the downlink A-CSI reference subframe configured by a network side device for the UE; and
   determining a serial number of a subframe corresponding to a subset of the downlink CSI measurement subframe set as the serial number of the downlink A-CSI reference subframe in the CSI measurement subframe set in accordance with a rule set in a protocol, wherein the subset comprises at least one subframe.

3. The method according to claim 2, wherein the rule set in the protocol comprises determining the serial number of the downlink A-CSI reference subframe in the downlink CSI measurement subframe set in accordance with serial numbers of the subframes in the downlink CSI measurement subframe set.

4. The method according to claim 3, wherein the serial numbers of the subframes in the downlink CSI measurement subframe set comprise a part of or all of:
   M1 lowest-ranked serial numbers of the subframes in the downlink CSI measurement subframe set; and
   M2 highest-ranked serial numbers of the subframes in the downlink CSI measurement subframe set,
   where M1 and M2 are each a positive integer.

5. The method according to claim 1, wherein
the serial number of the downlink A-CSI reference subframe in the downlink CSI measurement subframe set is configured at the network side.

6. The method according to claim 1, wherein subsequent to determining, by the UE, the at least two downlink CSI measurement subframe sets configured at the network side, the method further comprises:
with respect to one of the at least two downlink CSI measurement subframe sets, in the case that the downlink CSI measurement subframe set does not meet the predetermined condition, determining, by the UE, a downlink subframe within a range [subframe n−k1, subframe n−k2], which belongs to the downlink CSI measurement subframe set and which is closest to a subframe n, as the downlink A-CSI reference subframe in the downlink CSI measurement subframe set,
wherein the subframe n is an uplink subframe for transmitting A-CSI by the UE, the subframe n−k1 is a downlink subframe for transmitting A-CSI triggering signaling, where k1 and k2 are each a positive integer, and k1≥k2, wherein k2 is equal to 4.

7. The method according to claim 1, wherein subsequent to the step of determining, by the UE, the downlink A-CSI reference subframe in accordance with the determined serial number of the downlink A-CSI reference subframe, the method further comprises:
in the case that one of the at least two downlink CSI measurement subframe sets meets the predetermined condition and there is a plurality of downlink A-CSI reference subframes in the downlink CSI measurement subframe set, measuring, by the UE, A-CSI for the downlink CSI measurement subframe set in a downlink A-CSI reference subframe of the downlink A-CSI reference subframes which is closest to a subframe n, and in the case that the A-CSI triggering signaling corresponding to the downlink CSI measurement subframe set has been received in the subframe n−k1, returning a measurement value in the subframe n; or
in the case that one of the at least two downlink CSI measurement subframe sets meets the predetermined condition and there is only one downlink A-CSI reference subframe in the downlink CSI measurement subframe set, measuring, by the UE, the A-CSI for the downlink CSI measurement subframe set in the downlink A-CSI reference subframe, and in the case that the A-CSI triggering signaling corresponding to the downlink CSI measurement subframe set has been received in the subframe n−k1, returning a measurement value in the subframe n; or
in the case that one of the at least two downlink CSI measurement subframe sets meets the predetermined condition and there is a plurality of downlink A-CSI reference subframes in the downlink CSI measurement subframe set, storing, by the UE, a baseband signal value of a downlink A-CSI reference subframe in the downlink A-CSI reference subframes, which is closest to the subframe n, and in the case that the A-CSI triggering signaling corresponding to the downlink CSI measurement subframe set has been received in the subframe n−k1, determining an A-CSI measurement value of the downlink CSI measurement subframe set in accordance with the stored baseband signal value, and returning the A-CSI measurement value in the subframe n; or
in the case that one of the at least two downlink CSI measurement subframe sets meets the predetermined condition and there is only one downlink A-CSI reference subframe in the downlink CSI measurement subframe set, storing, by the UE, a baseband signal value of the downlink A-CSI reference subframe, and in the case that the A-CSI triggering signaling corresponding to the downlink CSI measurement subframe set has been received in the subframe n−k1, determining an A-CSI measurement value of the downlink CSI measurement subframe set in accordance with the stored baseband signal value, and returning the A-CSI measurement value in the subframe n.

8. The method according to claim 1, wherein subsequent to the step of determining the downlink A-CSI reference subframe in accordance with the determined serial number of the downlink A-CSI reference subframe, the method further comprises:
with respect to one of the at least two downlink CSI measurement subframe sets, in the case that there is a plurality of downlink A-CSI reference subframes in the downlink CSI measurement subframe set, measuring, by the UE, A-CSI about the downlink CSI measurement subframe set in a downlink A-CSI reference subframe in the downlink A-CSI reference subframes which is closest to the subframe n; or
with respect to one of the at least two downlink CSI measurement subframe sets, in the case that there is only one downlink A-CSI reference subframe in the downlink CSI measurement subframe set, storing, by the UE, a baseband signal value of the downlink A-CSI reference subframe, wherein the step of determining, by the UE, the downlink A-CSI reference subframe in accordance with the determined serial number of the downlink A-CSI reference subframe comprises:
in the case that a subframe corresponding to the serial number of the downlink A-CSI reference subframe and closest to the subframe n is an uplink subframe, determining, by the UE, a downlink subframe in the subframes corresponding to the serial number of the downlink A-CSI reference subframe and closest to the subframe n as the downlink A-CSI reference subframe; or
in the case that a subframe corresponding to the serial number of the downlink A-CSI reference subframe and closest to the subframe n is a downlink subframe, determining, by the UE, the downlink subframe as the downlink A-CSI reference subframe,
wherein the subframe n is an uplink subframe for returning the A-CSI by the UE, wherein in the case that there are two downlink CSI measurement subframe sets configured at the network side, the UE determines, with respect to one of the two downlink CSI measurement subframe sets, the downlink A-CSI reference subframe in the downlink CSI measurement subframe set in accordance with the predetermined rule.

9. A method for determining a reference subframe, comprising the steps of:
determining, by a network side device, at least two downlink CSI measurement subframe sets configured for a User Equipment (UE);
determining, by the network side device, that the downlink CSI measurement subframe set meets a predetermined condition, wherein the predetermined condition is set as: there is no downlink Aperiodic CSI (A-CSI) reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and where k1≥k2; and with respect to one of the at least two downlink CSI measurement subframe sets, determining, by the network side device, a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

10. The method according to claim 9, wherein the predetermined rule comprises one or two of:

determining a serial number of a subframe corresponding to a subset of the downlink CSI measurement subframe set as the serial number of the downlink A-CSI reference subframe in the CSI measurement subframe set in accordance with the downlink A-CSI reference subframe configured by the network side device for the UE; and determining a serial number of a subframe corresponding to a subset of the downlink CSI measurement subframe set as the serial number of the downlink A-CSI reference subframe in the CSI measurement subframe set in accordance with a rule set in a protocol, wherein the subset comprises at least one subframe.

11. The method according to claim 10, wherein the rule set in the protocol comprises determining the serial number of the downlink A-CSI reference subframe in the downlink CSI measurement subframe set in accordance with serial numbers of the subframes in the downlink CSI measurement subframe set.

12. The method according to claim 11, wherein the serial numbers of the subframes in the downlink CSI measurement subframe set comprise a part of or all of:

M1 lowest-ranked serial numbers of the subframes in the downlink CSI measurement subframe set; and M2 highest-ranked serial numbers of the subframes in the downlink CSI measurement subframe set, where M1 and M2 are each a positive integer.

13. The method according to claim 9, wherein the serial number of the downlink A-CSI reference subframe in the downlink CSI measurement subframe set is configured at a network side.

14. The method according to claim 9, wherein subsequent to the step of determining, by the network side device, the at least two downlink CSI measurement subframe sets configured for the UE, the method further comprises:

with respect to one of the at least two downlink CSI measurement subframe sets, in the case that the downlink CSI measurement subframe set does not meet the predetermined condition, determining, by the network side device, a downlink subframe within a range [subframe n−k1, subframe n−k2], which belongs to the downlink CSI measurement subframe set and which is closest to a subframe n, as the downlink A-CSI reference subframe in the downlink CSI measurement subframe set, wherein the subframe n is an uplink subframe for transmitting A-CSI by the UE, the subframe n−k1 is a downlink subframe for transmitting A-CSI triggering signaling, where k1 and k2 are each a positive integer, and k1≥k2, wherein k2 is equal to 4.

15. The method according to claim 9, wherein the step of determining, by the network side device, the downlink A-CSI reference subframe in accordance with the determined serial number of the downlink A-CSI reference subframe comprises:

in the case that a subframe corresponding to the serial number of the downlink A-CSI reference subframe and closest to the subframe n is an uplink subframe, determining, by the network side device, a downlink subframe in the subframes corresponding to the serial number of the downlink A-CSI reference subframe and closest to the subframe n as the downlink A-CSI reference subframe; or in the case that a subframe corresponding to the serial number of the downlink A-CSI reference subframe and closest to the subframe n is a downlink subframe, determining, by the network side device, the downlink subframe as the downlink A-CSI reference subframe, wherein the subframe n is an uplink subframe for returning the A-CSI by the UE.

16. The method according to claim 9, wherein in the case that there are two downlink CSI measurement subframe sets configured at the network side, the network side device determines, with respect to one of the two downlink CSI measurement subframe sets, the downlink A-CSI reference subframe in the downlink CSI measurement subframe set in accordance with the predetermined rule, wherein subsequent to the step of determining, by the network side device, the downlink A-CSI reference subframe in accordance with the determined serial number of the downlink A-CSI reference subframe, the method further comprises, with respect to one of the at least two downlink CSI measurement subframe sets, notifying, by the network side device, the UE of the downlink A-CSI reference subframe in the downlink CSI measurement subframe set, wherein subsequent to the step of determining, by the network side device, the downlink A-CSI reference subframe in accordance with the determined serial number of the downlink A-CSI reference subframe, the method further comprises transmitting, by the network side device, A-CSI triggering signaling with respect to at least one of the downlink CSI measurement subframe sets to the UE, so as to trigger the UE to report the A-CSI about the downlink A-CSI measurement subframe set, wherein the A-CSI reported by the UE is measured in the determined A-CSI reference subframe.

17. A User Equipment (UE) for determining a reference subframe, comprising:

a processor;

a hardware memory, which is connected with the processor via a bus interface and is configured to store program and data used for the processor; and a transceiver, which is configured to communicate with other devices through transmission media, wherein when the processor calls and executes the program and data stored in the hardware memory, the UE realizes the following steps:

determining at least two downlink Channel State Information (CSI) measurement subframe sets configured at a network side;

determining that the downlink CSI measurement subframe set meets a predetermined condition, wherein the predetermined condition is set as: there is no downlink Aperiodic CSI (A-CSI) reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and where k1≥k2; and with respect to one of the at least two downlink CSI measurement subframe sets, determining a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

18. A network side device for determining a reference subframe, comprising:

a processor;

a hardware memory, which is connected with the processor via a bus interface and is configured to store program and data used for the processor;

a transceiver, which is configured to communicate with other devices through transmission media, when the processor calls and executes the program and data stored in the hardware memory, the network side device realizes the following steps:

determining at least two downlink CSI measurement subframe sets configured for a User Equipment (UE);

determining that the downlink CSI measurement subframe set meets a predetermined condition, wherein the predetermined condition is set as: there is no downlink Aperiodic CSI (A-CSI) reference subframe within a range [subframe n−k1, subframe n−k2] which belongs to the downlink CSI measurement subframe set, a subframe n being an uplink subframe for transmitting A-CSI by the UE, the subframe n−k1 being a downlink subframe for transmitting A-CSI triggering signaling, where k1 and k2 being each a positive integer, and where k1≥k2; and with respect to one of the at least two downlink CSI measurement subframe sets, determining a serial number of a downlink A-CSI reference subframe in the downlink CSI measurement subframe set in accordance with a predetermined rule, and determining the downlink A-CSI reference subframe in accordance with the determined serial number of the downlink A-CSI reference subframe.

\* \* \* \* \*